O. S. WARREN.
EXTRA SEAT FOR AUTOMOBILES.
APPLICATION FILED JAN. 20, 1915.
1,167,453. Patented Jan. 11, 1916.
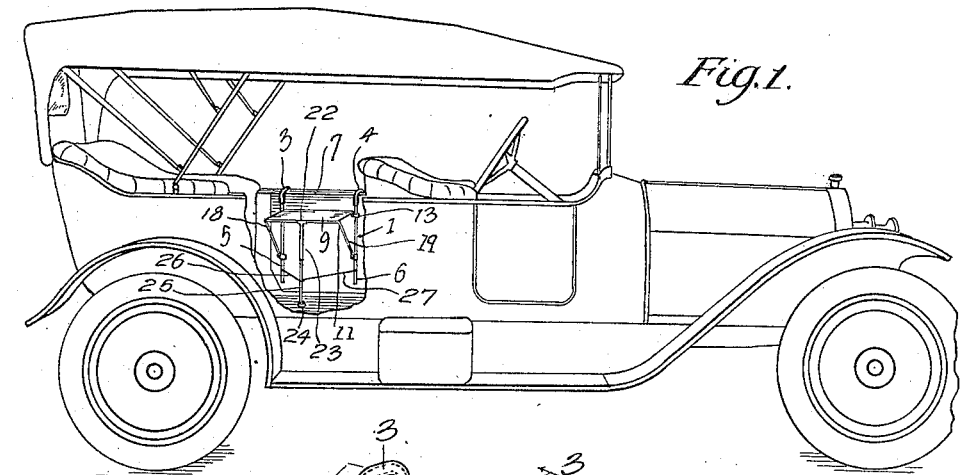
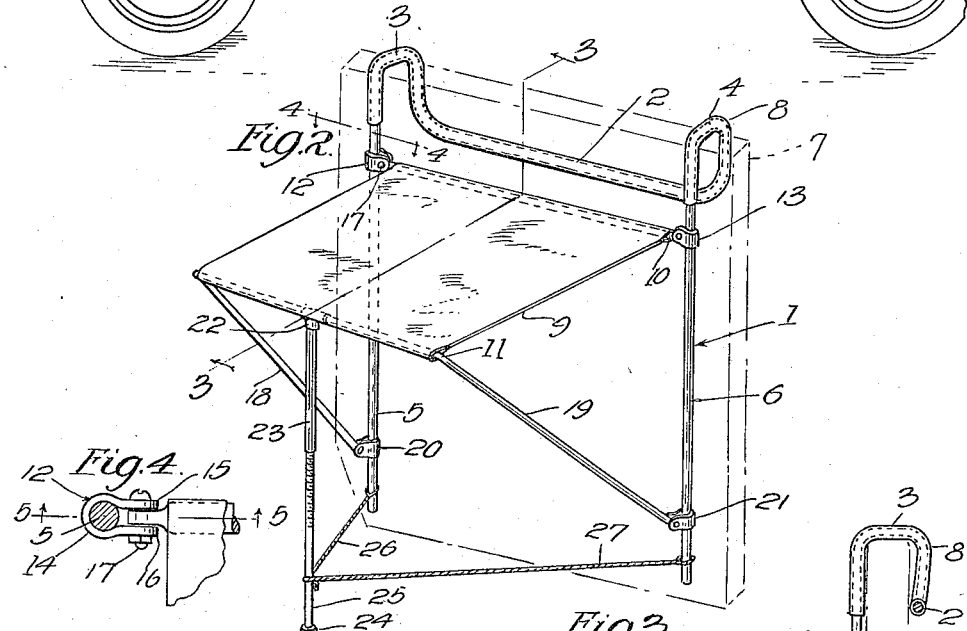
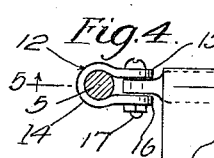
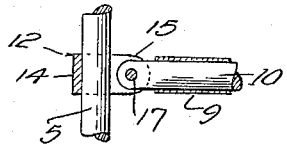
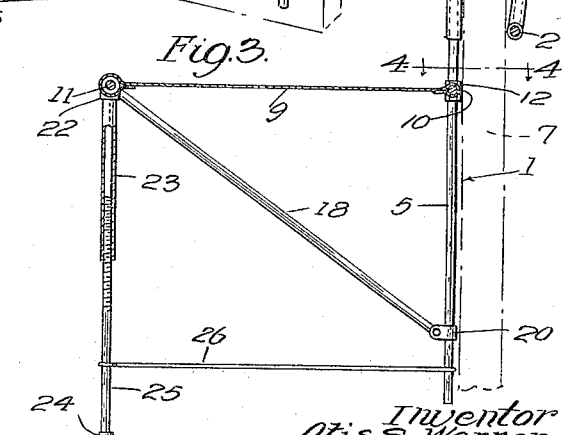

UNITED STATES PATENT OFFICE.

OTIS S. WARREN, OF LOS ANGELES, CALIFORNIA.

EXTRA SEAT FOR AUTOMOBILES.

1,167,453. Specification of Letters Patent. Patented Jan. 11, 1916.

Application filed January 20, 1915. Serial No. 3,221.

*To all whom it may concern:*

Be it known that I, OTIS S. WARREN, a citizen of the United States, residing at Los Angeles, in the county of Los Angeles and State of California, have invented a new and useful Extra Seat for Automobiles, of which the following is a specification.

My object is to make a portable, adjustable extra seat for automobiles, and especially for jitney bus service; and my invention consists of the novel features herein shown, described and claimed.

Figure 1 is a side elevation of an automobile, parts being broken away to show an extra seat embodying the principles of my invention in position for use upon the farther door. Fig. 2 is a perspective of my extra seat for automobiles. Fig. 3 is a vertical cross section on the line 3—3 of Fig. 2. Fig. 4 is a horizontal sectional detail on the lines 4—4 of Figs. 2 and 3. Fig. 5 is a fragmentary vertical sectional detail on the line 5—5 of Fig. 4.

The supporting frame is formed of a single piece of round rod, such as $\frac{5}{16}$ inch wire, or thereabout, and comprises a central brace 2, return bends 3 and 4, extending upwardly from the ends of the central brace 2 and the posts 5 and 6, extending outwardly from the inner ends of the return bends. The return bends 3 and 4 are adapted to fit the upper edge of the door 7 and the brace 2 fits against the opposite side of the door from the posts 5 and 6. The return bends 3 and 4 and the brace 2 are covered with a cushion 8, such as a piece of rubber tubing or the like, so as not to mar the door. The canvas seat 9 is mounted upon the adjustable rear cross bar 10 and the adjustable front cross bar 11. The rear cross bar 10 is adjustably connected to the posts 5 and 6 by clips 12 and 13, each of said clips comprising a bearing portion 14 and ears 15 and 16; the bearing portion 14 is bent or formed small enough so that when the ears 15 and 16 are drawn together, the clips will grip the posts 5 and 6. The cross bar 10 is flattened upon its ends and these ends are placed between the ears of the clips 12 and 13 and secured by bolts 17. When the bolts 17 are loosened, the cross bar 10 may move up and down to the desired position, and when the bolts 17 are tightened, the cross bar 10 will be held rigidly in its adjusted position. The cross bar 11 is formed integral with the braces 18 and 19 and the ends of said braces are connected to the clips 20 and 21 adjustably mounted upon the posts 5 and 6. The clips 20 and 21 are identical in construction with the clips 12 and 13, so that the cross bar 11 may be adjusted up and down by manipulating said clips 20 and 21. The T 22 is mounted upon the central portion of the cross bar 11 and a tubular leg 23 extends downwardly from the T and the foot 24 has a pintle 25 screw seated into the leg 23, so that the foot 24 may be adjusted up and down relative to the cross bar 11. Cords 26 and 27 connect the pintle 25 to the lower ends of the posts 5 and 6, so as to hold the leg 23 from swinging outwardly beyond a vertical position. When it is desired to fold the seat, the cross bar 11 is lifted and the leg 23 swings toward the posts 5 and 6. The posts 5 and 6 are preferably short enough so that they will not reach to the floor of the car and after the supporting frame 1 has been placed in position, the pintle 25 is manipulated until the leg 23 is long enough to reach the floor and hold the canvas seat 9 substantially level.

The details of construction may be varied in many ways without departing from the spirit of my invention, as set up in the following claims.

I claim:

1. A seat, comprising return bends, a brace connecting the outer ends of the return bends, posts extending outwardly from the inner ends of the return bends, a flexible seat, a supporting bar adjustably mounted upon the upper ends of the posts, a second supporting bar, braces connecting the second supporting bar adjustably to the lower ends of the posts, and an adjustable leg carried by the second supporting bar.

2. A seat, comprising return bends, a brace connecting the outer ends of the return bends extending downwardly from the inner ends of the return bends, a cross bar adjustably mounted upon the upper ends of the posts, a second cross bar, braces connecting the second cross bar adjustably to the lower ends of the posts, a flexible seat connecting said cross bars, an adjustable leg carried by the second cross bar, and cords connecting the lower end of the adjustable leg to the lower ends of the posts.

OTIS S. WARREN.

Witnesses:
CLARENCE J. WILLIAMS,
SEMER G. WELLS.

Copies of this patent may be obtained for five cents each, by addressing the "Commissioner of Patents, Washington, D. C."